United States Patent
Nayshtur et al.

(10) Patent No.: US 9,798,895 B2
(45) Date of Patent: Oct. 24, 2017

(54) PLATFORM IDENTITY ARCHITECTURE WITH A TEMPORARY PSEUDONYMOUS IDENTITY

(71) Applicant: McAfee, Inc., Santa Clara, CA (US)

(72) Inventors: Alex Nayshtur, Gan Yavne (IL); Ned Smith, Beaverton, OR (US); Avishay Sharaga, Bet Nehemya (IL); Oleg Pogorelik, Lapid (IL); Abhilasha Bhargav-Spantzel, Santa Clara, CA (US); Michael Raziel, Jeruslaem (IL); Avi Priev, Jerusalem (IL); Adi Shaliv, Nir-Banim (IL); Igor Muttik, Berkhamsted (GB)

(73) Assignee: McAfee, Inc., Santa Clara, CA (US)

( * ) Notice: Subject to any disclaimer, the term of this patent is extended or adjusted under 35 U.S.C. 154(b) by 160 days.

(21) Appl. No.: 14/495,959

(22) Filed: Sep. 25, 2014

(65) Prior Publication Data

US 2016/0092697 A1 Mar. 31, 2016

(51) Int. Cl.

| G06F 21/62 | (2013.01) |
|---|---|
| G06Q 30/02 | (2012.01) |
| H04W 8/06 | (2009.01) |
| H04W 12/00 | (2009.01) |
| H04W 4/02 | (2009.01) |
| H04W 4/20 | (2009.01) |

(52) U.S. Cl.
CPC ..... *G06F 21/6254* (2013.01); *G06Q 30/0261* (2013.01); *H04W 4/021* (2013.01); *H04W 4/206* (2013.01); *H04W 8/06* (2013.01); *H04W 12/00* (2013.01)

(58) Field of Classification Search
CPC .................................................. G06F 21/6254
USPC ......................................................... 726/26
See application file for complete search history.

(56) References Cited

U.S. PATENT DOCUMENTS

| 5,987,610 A | 11/1999 | Franczek et al. |
|---|---|---|
| 6,073,142 A | 6/2000 | Geiger et al. |
| 6,460,050 B1 | 10/2002 | Pace et al. |
| 7,506,155 B1 | 3/2009 | Stewart et al. |
| 2006/0141981 A1 | 6/2006 | Lin |
| 2010/0042847 A1 | 2/2010 | Jung et al. |
| 2010/0177663 A1* | 7/2010 | Johansson ............... H04W 4/00 370/254 |
| 2012/0233036 A1* | 9/2012 | Mirashrafi ............. G06Q 30/00 705/27.2 |
| 2013/0006866 A1* | 1/2013 | Pendakur ........... G06Q 30/0241 705/50 |
| 2014/0068743 A1 | 3/2014 | Marcus et al. |
| 2014/0173274 A1* | 6/2014 | Chen ..................... H04L 9/3073 713/155 |
| 2014/0282962 A1 | 9/2014 | Harrison |

FOREIGN PATENT DOCUMENTS

| EP | 2 456 120 A1 | 5/2012 |
|---|---|---|
| WO | WO 2016/048535 A1 | 3/2016 |

OTHER PUBLICATIONS

International Search Report and Written Opinion in International Application No. PCT/US2015/046815, mailed on Feb. 16, 2016, 11 pages.
International Preliminary Report on Patentability in International Application No. PCT/US2015/046815, mailed on Mar. 28, 2017, 9 pages.

* cited by examiner

*Primary Examiner* — Jacob Lipman
(74) *Attorney, Agent, or Firm* — Patent Capital Group

(57) ABSTRACT

In an example, a client-server platform identity architecture is disclosed. The platform identity architecture may be used to enable a venue operator to provide online services and to collect telemetry data and metrics while giving end users greater control over privacy. When entering a compatible venue, the user's device generates a signed temporary pseudonymous identity (TPI) in secure hardware or software. Any telemetry uploaded to the venue server includes the signature so that the server can verify that the data are valid. The TPI may have a built-in expiry. The venue server may thus receive useful tracking data during the term of the TPI, while the user is assured that the data are not kept permanently or correlated to personally-identifying information.

23 Claims, 6 Drawing Sheets

PLATFORM IDENTITY ARCHITECTURE WITH A TEMPORARY PSEUDONYMOUS IDENTITY

FIELD OF THE DISCLOSURE

This application relates to the field of consumer privacy, and more particularly to a temporary pseudonymous identity for a user.

BACKGROUND

As Internet access becomes nearly ubiquitous in the developed world, users find themselves increasingly online. Whereas in times past, a user had to sit down at a desktop computer and deliberately dial-up to a slow, modem-based Internet service, get his online work done quickly, and then immediately log off to free up the phone line, a modern user may be always connected to a plurality of devices. The user may carry a smart phone, which may include a GPS, a wireless data plan, and Wi-Fi capabilities, ensuring that the user is rarely disconnected from one data service or another. The user may also carry a laptop with Wi-Fi enabled or with a mobile data service, and the Wi-Fi may be configured to automatically connect or attempt to connect to open Wi-Fi networks. Thus, connecting to the Internet is no longer a deliberate and temporary act, but rather a natural and automatic part of interacting with modern society.

As the number of Internet users, connected devices, and available connection methods have proliferated, so too has the value of "big data" increased. Networks of tracking cookies and data aggregators create a complex, deeply interconnected web of trails, so that practically everything a user does online in one place can be correlated to practically everything else he does online in any other place. Indeed, in some cases, a user may be required to sign up with personally-identifying information, or provide a Google or Facebook account, for example, to gain access to a desired service.

These metrics may be of especial value to advertisers and merchants, who want to spend their advertising dollars targeting the most relevant users. In some cases, targeted advertisements may be much more likely to produce an actual sale than mass advertisements targeted almost indiscriminately at a general audience.

Data metrics may also be useful to end users, who may receive more relevant and interesting content. Thus, in some cases, users willingly provide metrics in hopes of having a better online experience.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
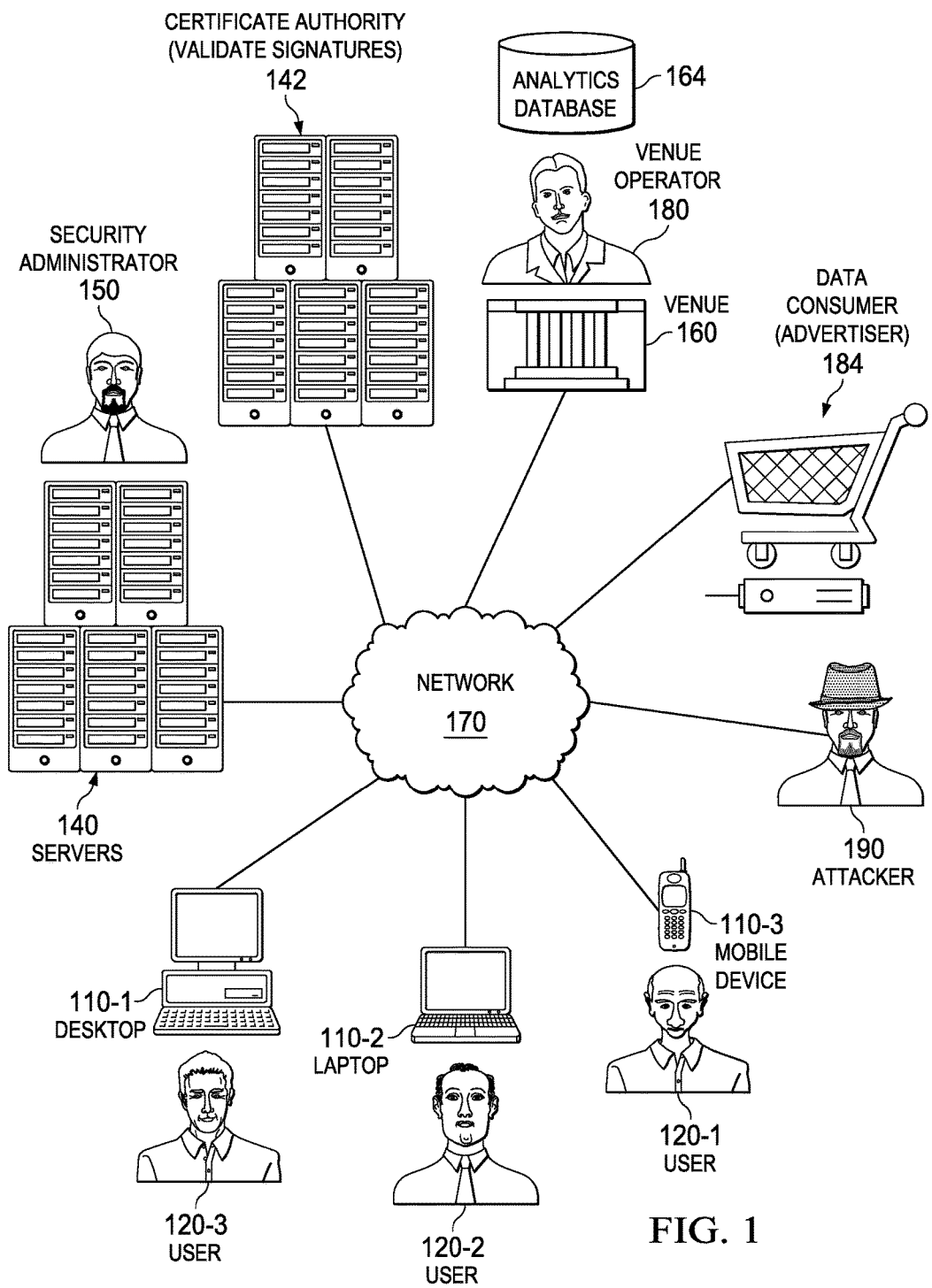
FIG. 1 is a block diagram of a security-enabled network according to one or more examples of the present Specification.

In an example, a client-server platform identity architecture is disclosed. The platform identity architecture may be used to enable a venue operator to provide online services and to collect telemetry data and metrics while giving end users greater control over privacy. When entering a compatible venue, the user's device generates a signed temporary pseudonymous identity (TPI) in secure hardware or software. Any telemetry uploaded to the venue server includes the signature so that the server can verify that the data are valid. The TPI may have a built-in expiry. The venue server may thus receive useful tracking data during the term of the TPI, while the user is assured that the data are not kept permanently or correlated to personally-identifying information.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

As big data and user metrics approach ubiquity, a privacy backlash has also arisen. In this privacy countermovement, many users are concerned about large, faceless companies collecting such a vast trove of personal information about them. In particular, some users may not want everything they do online to be permanently traced back to them. Some users prefer to keep at least some of their online activities completely private, and for other activities, even if they are not per se private, users may find it unsettling to have such a comprehensive profile of their activities kept.

Indeed, after the user has connected, the venue controls the entire international standards organization open systems interconnect (ISO OSI) stack of MAC address, IP address/DHCP name, DNS name, SSL/TLS session ID, BIOS GUID, application UUIDs, email address, certificate and SSL. Additional private details such as a MAC address and/or application IDs may become available in the networking and could be stored in the service provider's database for further tracking and analytics and ultimate accumulation and permanent storage.

Thus, many users have become very interested in data privacy, and in ensuring that their every online transaction is not aggregated into a single giant database, which is then permanently stored. To increase privacy, users may install add-ons to web browsers, such as ad blockers and privacy guards.

Thus, the interests of users who value privacy highly may seem to be directly at odds with the interests of merchants and advertisers value the ability to provide targeted content.

An additional factor comes into play when the value of data aggregation partially or wholly offsets the cost of providing network or online services. For example, a venue like a shopping mall or a sports park may offer "free" Wi-Fi service for users. In exchange, the user may be required to agree to some level of tracking to provide value for the venue operator.

When a user with a Wi-Fi capable device enters a mall, for example, the mall may provide Wi-Fi access throughout its premises via an open wireless access point (WAP). When a user connects to the open WAP, he may be required to agree to a terms of service before accessing the Internet or other network services. The terms of service may include a provision that the user's activities within the mall may be tracked for advertising purposes, thus enriching the value of the Wi-Fi network to both the mall and the end user. Specifically, the end user receives the desired Internet access, while the mall receives the ability to target advertisements to the user. The user may also, in some cases, agree to receive "push" notifications of special deals that may be of interest to him.

However, if the user is extremely privacy conscious, then the terms of service may not be acceptable to the user. In that case, the user does not receive the free Internet access, and the mall receives no value from providing the WAP.

The present Specification, however, describes a platform identity client-server architecture, in which the privacy-conscious end-user and the venue operator may reach a compromise. Specifically, the user provides some information in connection with a pseudonymous temporary identity (TPI), but the TPI is not tied to personally-identifying information (though it may include certain non-personal demographic data), and has a fixed expiry. Thus, a user in a ballpark, for example, may log on to free WiFi provided by the venue operator, and may agree to receive push notifications. In this example, the venue operator may notify the user of food specials or contests while tracking which portions of the park the user visits, and in some cases where he spends money. However, upon expiration, the TPI is destroyed. To effect this compromise, the user can be confident that his device will cease to provide data under the TPI after it expires, while the venue operator can trust that signed data from the device is valid before the TPI expires.

To that end, the present Specification describes a client-server architecture in which a platform identity client (PIC) on the user's device communicates with a platform identity server operated by the venue operator, which may also provide or interact with a network-based ("cloud") attestation service.

In an example of the present Specification, a user's computing device includes a PIC, which may be a native application, a browser add-on, or other software delivery mechanism. The PIC is operable, in one embodiment, to detect when the user enters an area where a TPI may be used, such as a venue with an open WAP. The PIC operates in a trusted execution environment (TEE), such as a secure memory area (an "enclave") accessible only via special secure instructions (for example, as provided by the Intel® SGX architecture), or a secure co-processor such as Intel's® Xeon Phi™, a trusted platform module (TPM)-compliant cryptoprocessor, or Intel's® Converged Security Engine (CSE). As used throughout this Specification, the terms "trusted execution environment" and "TEE" are used to encompass any such solution, whether it be implemented in hardware, software, firmware, or a combination of the three.

A TPI may be verified via direct anonymous attestation (DAA). DAA is a cryptographic protocol that is configured to provide remote authentication while preserving the end user's privacy. DAA requires a trusted third party, a privacy certificate authority (privacy CA) to authenticate a certificate. Each TEE has an embedded RSA key pair, which the privacy CA knows. To attest, the TEE generates a second key called an Attestation Identity Key (AIK). The TEE sends the public AIK, signed by an endorsement key (EK), to the privacy CA, which verifies that the key is authentic. Advantageously, because an entire class of TEEs from a single manufacturer may share a common EK, the EK itself is not personally identifying of the user or his machine. This provides an enhanced privacy identifier (EPID), which uniquely identifies the user only for a time, and does not connect to the user's real-word identity, providing complete anonymity. In one example, the TPI is an additional layer on top of the EPID that provides a compromise between complete anonymity and complete tracking. The attestation service of the present Specification ensures that the TPI is authentic, even though it does not personally identify the user. The venue is able to identify the user temporarily and perform useful temporary tracking, while the user is able to retain real-world anonymity and prevent the temporary tracking from becoming a permanent database.

A "SIGMA" protocol may allow a service provider-supplied "basename" value that allows the venue operator to track repeat customers indefinitely. However repeat customers have no ability to opt out after the initial tracking is started. Advantageously, the method disclosed in this Specification permits the user to opt out at any time.

SIGMA is a "SIGn" and "MAc" protocol based on Diffie-Hellman key agreement. There are internet engineering task force (IETF) standards describing a class of SIGMA protocols. Intel Sigma uses an EPID key to sign the Diffie-Hellman key exchange to correct for man-in-the-middle (MITM) vulnerability. EPID is anonymous, so there is still a possibility that a TEE could implement MITM logic that is exploitable by an attacker. However, attestation can correct this. The basename is a parameter that is supplied by the verifier. If the verifier wishes to begin tracking repeat transactions by this client, he can assign a unique ID in the basename that can be used by the verifier to build a log of all subsequent transactions. The transaction log is a form of telemetry data or reputation data that can be used for fraud detection or as a historical record for non-repudiation.

In certain embodiments, EPID and SIGMA may be used to construct pseudonymous identifiers by mixing a basename value supplied by a second party with a random or pseudorandom number, to create a pseudonymous ID that is used for the duration of a TPI session. Mixing may be performed via XOR or SHA256, for example. The expiry of the TPI may be selected by the first party or suggested by the second party.

In one example, a TPI may be computed as follows:

TPI=SHA256(DRNG(seed),basename,validity,"TPI");

Is this example, DRNG( ) is a digital random number generator, but may also be a pseudorandom number generator. "Basename" is a value supplied by the second party (verifier, e.g., the venue operator). "Validity" specifies an expiry, which may be an absolute time or a time range. The string "TPI" is used to prevent accidental use as a non-TPI object. The resulting values are concatenated before being hashed.

In this example, the first party (client) has the option of evaluating the basename against a whitelist or may apply entropy testing to discover uniqueness attributes and if the basename appears to be too privacy-revealing. If so, the PIC may discontinue participation and not generate a TPI, or may substitute a different basename value that is more desirable. The PIC may then report the new basename in its response. The second party then has the option of accepting the alternate or refusing to complete the transaction.

EPID may be used to construct an anonymous channel over which the pseudonymous identifier negotiation may take place Upon detecting that the user has entered a TPI-capable area, the PIC communicates with a platform identity server to negotiate TPI parameters including, for example, the metadata, demographic data, and expiry that will be attached to the TPI. The PIC then provides the TPI, including in one example a secure digital signature, to the platform identity server.

The platform identity server may include a platform identity server engine and an attestation service, which may be a cloud-based service. The platform identity server engine receives the TPI from the end-user's device, and may verify it with the attestation service, such as verifying that the certificate is genuine. Once the platform identity server has fully validated and authenticated the end user's TPI, the platform identity server may begin collecting telemetry data from the client's computing device. While the TPI remains valid, the platform identity server may use the TPI to craft targeted advertisements and to push out advertisements or notifications to the user or otherwise provide useful services.

Furthermore, users may opt into a privacy policy specified by the venue operator. If the venue operator requests more information than is appropriate or desired by the user, the user may modify the policy to satisfy the user's privacy concerns. The service provider may not be able to provide a higher level of security protection or shopping convenience given missing telemetry data, but the user is in control of deciding which balance to strike.

In one example, a platform identity architecture further includes a public service provider, which may personalized service in the context of a user's current or recent purchasing behavior, collects and analyzes data on the user's activities, and provides targeted information or advertisement. In that case, the expiry may be longer than for a venue-specific service, but ultimately the user's anonymity is maintained so long as his identity is not tied to the TPI. In an embodiment, the PIC may generate a new TPI on a revolving basis, so that the user always has an existing TPI with the service provider, but the current TPI cannot be correlated back to expired TPIs or to the user's real-world identity.

According to an example method, the service provider may send a policy definition to the TPI service in the TEE. This policy may specify expected parameters such as the expiry, identity derivation algorithm definitions, and the size in bytes of the TPI. This may also include specific application information and identification such as a user ID or email, which also may be temporary. For example, the TPI lifetime may be 12 hours and a random key size may be 256 bytes.

The end user may accept or decline the policy according to his needs and desires. No privacy-sensitive data are shared before the user accepts the policy. In some embodiments, the user may also modify the policy before accepting it, and the venue operator may craft available services based on the privacy options the user selects. Once the policy is set, it remains active until the TPI is replaced or re-provisioned. Policy provisioning is optional in some embodiments, and a predefined default policy may be provided.

In basic operation, the PIC may collect telemetry data that are meaningful to the service provider. The PIC may also check whether incoming requests from the platform identity server request information inconsistent with the user's current security settings. If so, the request may be denied. If the policy is satisfied, however, the PIC may provide the requested data, signed by the TPI.

Attested telemetry data may be forwarded to a cloud service provider that analyzes the telemetry data. Before trusting and acting on the data, the attestation signature (EPID) of the TPI may be validated. This may include using a separate verification service, such as an attestation server. Attested telemetry data may improve the overall quality of the service because there are fewer cases of poisoned telemetry data by rogue clients. A TPI service allows the user to play a role in managing his or her own privacy by selecting which demographic, metadata, or other data may be provided to the service provider. In this Specification, any demographic data, metadata, user metrics, tracking data, or logging provided to a service provider via a TPI is referred to as "telemetry." Telemetry data may also include data from systems or subsystems surrounding the PIC, including untrusted portions of the client device. Telemetry data may further comprise data collected from attached peripherals and network connected devices, which may also be untrusted. The PIC may filter, scan or otherwise evaluate telemetry data destined for the receiving party and selectively reduce the data sent to preserve privacy.

Each telemetry packet may be signed a DAA signature. DAA signatures allow the service provider to place trust in the quality of collected data, regarding unauthenticated collection as more likely to be poisonous data.

A PIC device may collect telemetry data that are meaningful to the venue operator. In one case, a PIC engine may also check whether the server requests telemetry data not authorized by the user. If so, the TPI identity request may be denied. If the policy is satisfied, a TPI is generated that specifies an appropriate expiry given the privacy sensitivity contained in the telemetry data. The TPI service may reevaluate the TPI for subsequent uses of the same TPI. If appropriate, a new TPI may be generated or disclosure of telemetry data may be denied.

The platform identity architecture of the currents Specification provides a method for ensuring the user's ultimate privacy while enabling use of localized location and advertising services. Advantageously, the system and method of the present Specification breaks the privacy-versus-analytics deadlock that may be hindering adoption of certain services. This method allows the user to maintain his privacy while enjoying online services, while simultaneously allowing the service provider to maintain the ability to aggregate and correlate data for the duration of the users connected session in the venue.

Further advantageously, even once the TPI expires, although the user's device will not provide any new information under that TPI, the venue and data aggregators may still use the demographic data to provide useful templates for targeting advertising.

The client has the option of refusing to accept the basename if it wishes to not be tracked. This is a privacy feature.

Further advantageously, each service provider may receive a unique TPI and the lifecycle of the TPI may be controlled by the user.

Further advantageously, the TPI may not be linked back to a specific user.

A platform identity architecture will now be described with more particular reference to the appended FIGURES.

FIG. 1 is a network-level diagram of a distributed security network 100 according to one or more examples of the present Specification. In the example of FIG. 1, a plurality of users 120 operate a plurality of computing devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in some cases may also be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. In this illustration, network 170 is shown as a single network for simplicity, but in some embodiments, network 170 may include a large number of networks, such as one or more enterprise intranets connected to the internet.

Also connected to network 170 are one or more servers 140, a attestation server 142, a venue operator 180, and a data consumer 184. A malicious attacker 190 may also operate on network 170.

Servers 140 may be configured to provide network services, including services for venue 160. In one embodiment, servers 140 and at least a part of network 170 are administered by one or more security administrators 150.

It may be a goal of users 120 to successfully operate their respective computing devices 110 without disclosing personal information to servers venue operator 180, data consumers 184, or attacker 190, who may use the personal data for identity theft, for example.

Servers 140 may be operated by a suitable enterprise to provide useful network services, such as internet connectivity and/or advertising services. Servers 140 may also provide substantive services such as routing, networking, enterprise data services, and enterprise applications.

Attestation server 142 may be operated by venue operator 180 or by a trusted third party. In one example, attestation server 142 may be or may provide a certificate authority.

Venue operator 180 may operate venue 160. Venue 160 may be any suitable physical venue, such as a retail establishment, mall, ballpark, sports arena, events center, office park, stadium, office tower, restaurant, theme park, amusement park, fairgrounds, event, or government building by way of non-limiting example. In other cases, venue 160 may not be a physical location, but may instead be an online portal requiring user authentication, in which case a TPI may be provided as user credentials.

Because venue operator 180 may, in some cases, be a commercial enterprise, venue operator 180 may be interested in maximizing financial value. To that end, venue operator 180 may operate an analytics database 164, in which venue operator 180 may collect, aggregate, and/or analyze user metrics. In some cases, venue operator 180 may be able to sell data from analytics database 164 to data consumer 184.

Data consumer 184 may be an advertiser, merchant, or data aggregator or broker. It may be in the interest of data consumer 184 to collect and aggregate as much data about users 120 as possible. These data may be even more valuable if they include personally-identifying information. Thus, in some cases, the interests of venue operator 180 and data consumer 184 may in opposition to the interests of a highly privacy conscious user 120. Furthermore, if attacker 190 gains access to analytics database 164, or an even larger database operated by data consumer 184, users 120 of that database may be subject to identity theft.

Figure 2:
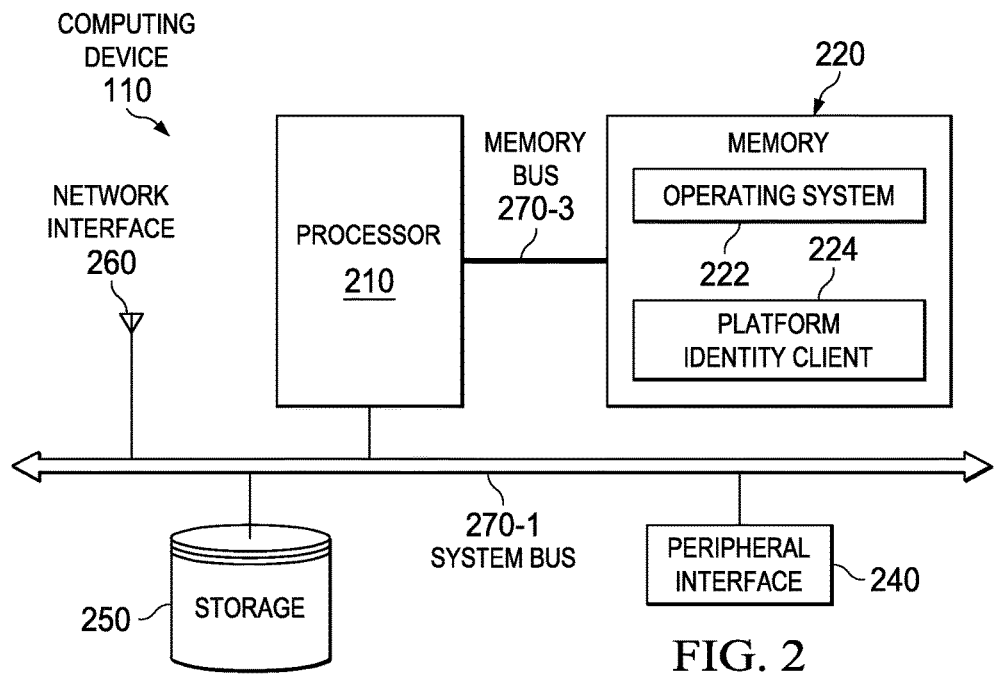
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 110 includes a processor 210 connected to a memory 220, having stored therein executable instructions for providing an operating system 222 and PIC engine 224. Other components of client device 110 include a storage 250, network interface 260, and peripheral interface 240.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. It should be noted, however, that DMA is disclosed by way of non-limiting example only. In other cases, memory 220 may connect to processor 210 via system bus 270-1 or any other suitable bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of PIC engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 5:
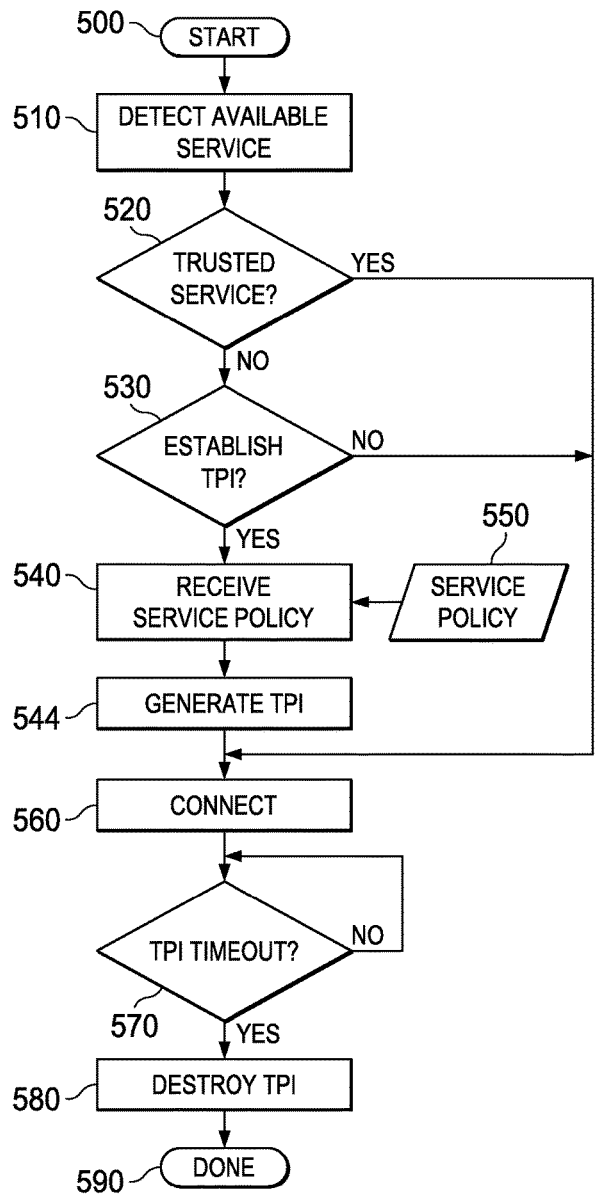
FIG. 5 is a flow chart of a method performed by a computing device according to one or more examples of the present Specification.

PIC engine 224, in one example, includes a utility or program that carries out a method, such as method 500 of FIG. 5, or other methods according to this Specification. PIC engine 224 may be, in various embodiments, embodied in hardware, software, firmware, or some combination thereof. For example, in some cases, PIC engine 224 may include a special integrated circuit designed to carry out a method or a part thereof, and may also include software instructions operable to instruct a processor to perform the method. PIC engine 224 may also include a TEE in certain embodiments.1 In some cases, PIC engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that PIC engine 224 is provided by way of non-limiting example only, and that other hardware and software, including interactive or user-mode software, may also be provided in conjunction with, in addition to, or instead of PIC engine 224 to perform methods according to this Specification.

In one example, PIC engine 224 includes executable instructions stored on a non-transitory medium operable to perform method 500 of FIG. 5, or a similar method according to this Specification. At an appropriate time, such as upon booting client device 110 or upon a command from operating system 222 or a user 120, processor 210 may retrieve a copy of PIC engine 224 (or software portions thereof) from storage 250 and load it into memory 220. Processor 210 may then iteratively execute the instructions of PIC engine 224.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
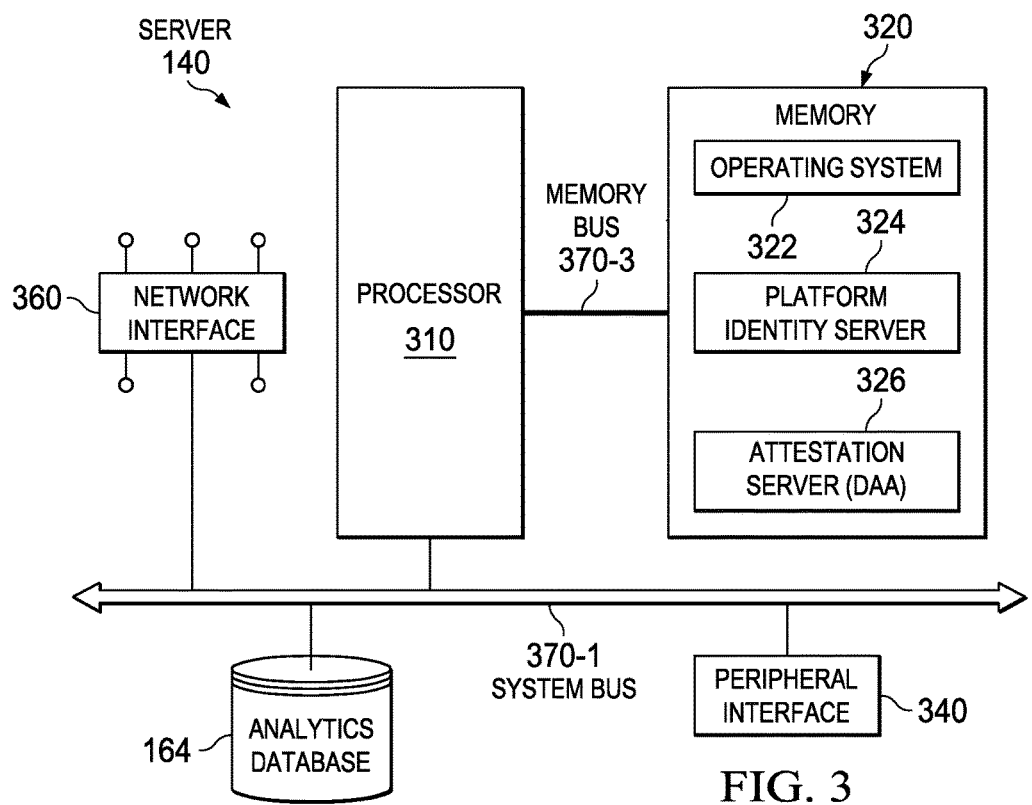
FIG. 3 is a block diagram of a server according to one or more examples of the present Specification.

FIG. 3 is a block diagram of server 140, including an attestation server 142, according to one or more examples of the present Specification. In various embodiments, server 140 and attestation server 142 may be separate devices operated by completely different entities, or may be a single device operated by a single entity. Server 140 and attestation server 142 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and server engine 324. Other components of server 140 include a storage 350, network interface 360, and peripheral interface 340.

In an example, processor 310 is communicatively coupled to memory 320 via memory bus 370-3, which may be for example a direct memory access (DMA) bus. It should be noted, however, that DMA is disclosed by way of non-limiting example only. In other cases, memory 320 may connect to processor 310 via system bus 370-1 or any other suitable bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324. Many other configurations are also possible, and are intended to be encompassed within the broad scope of this Specification.

Network interface 360 may be provided to communicatively couple server 140 to a wired or wireless network.

Figure 6:
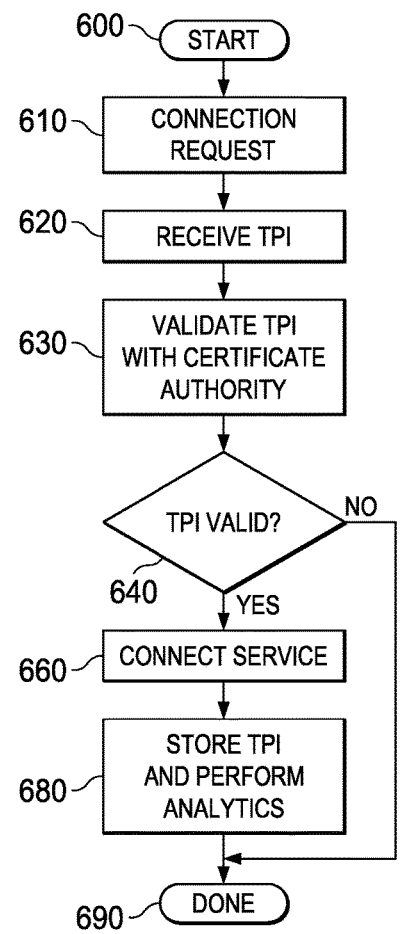
FIG. 6 is a block diagram of a method performed by a server according to one or more examples of the present Specification.

Server engine 324, in one example, is a utility or program that carries out methods, such as portions of method 600 of FIG. 6. Server engine 324 may be, in various embodiments, embodied in hardware, software, firmware, or some combination thereof. For example, in some cases, server engine 324 may include a special integrated circuit designed to carry out a method or a part thereof, and may also include software instructions operable to instruct a processor to perform the method. In some cases, server engine 324 may run as a daemon process, as described above. It should also be noted that server engine 324 is provided by way of non-limiting example only, and that other hardware and software, including interactive or user-mode software, may also be provided in conjunction with, in addition to, or instead of server engine 324 to perform methods according to this Specification.

In one example, server engine 324 includes executable instructions stored on a non-transitory medium operable to perform method 600 of FIG. 6. At an appropriate time, such as upon booting server 140 or upon a command from operating system 322 or a user 120, processor 310 may retrieve a copy of server engine 324 (or software portions thereof) from storage 350 and load it into memory 320. Processor 310 may then iteratively execute the instructions of server engine 324.

Attestation server 326, in one example, is a utility or program that carries out methods, such as portions of method 600 of FIG. 6. Attestation server 326 may be, in various embodiments, embodied in hardware, software, firmware, or some combination thereof. For example, in some cases, attestation server 326 may include a special integrated circuit designed to carry out a method or a part thereof, and may also include software instructions operable to instruct a processor to perform the method. In some cases, attestation server 326 may run as a daemon process, as described above. It should also be noted that attestation server 326 is provided by way of non-limiting example only, and that other hardware and software, including interactive or user-mode software, may also be provided in conjunction with, in addition to, or instead of attestation server 326 to perform methods according to this Specification.

In one example, attestation server 326 includes executable instructions stored on a non-transitory medium operable to perform method 600 of FIG. 6. At an appropriate time, such as upon booting server 140 or upon a command from operating system 322 or a user 120, processor 310 may retrieve a copy of attestation server 326 (or software portions thereof) from storage 350 and load it into memory 320. Processor 310 may then iteratively execute the instructions of attestation server 326.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

Figure 4:
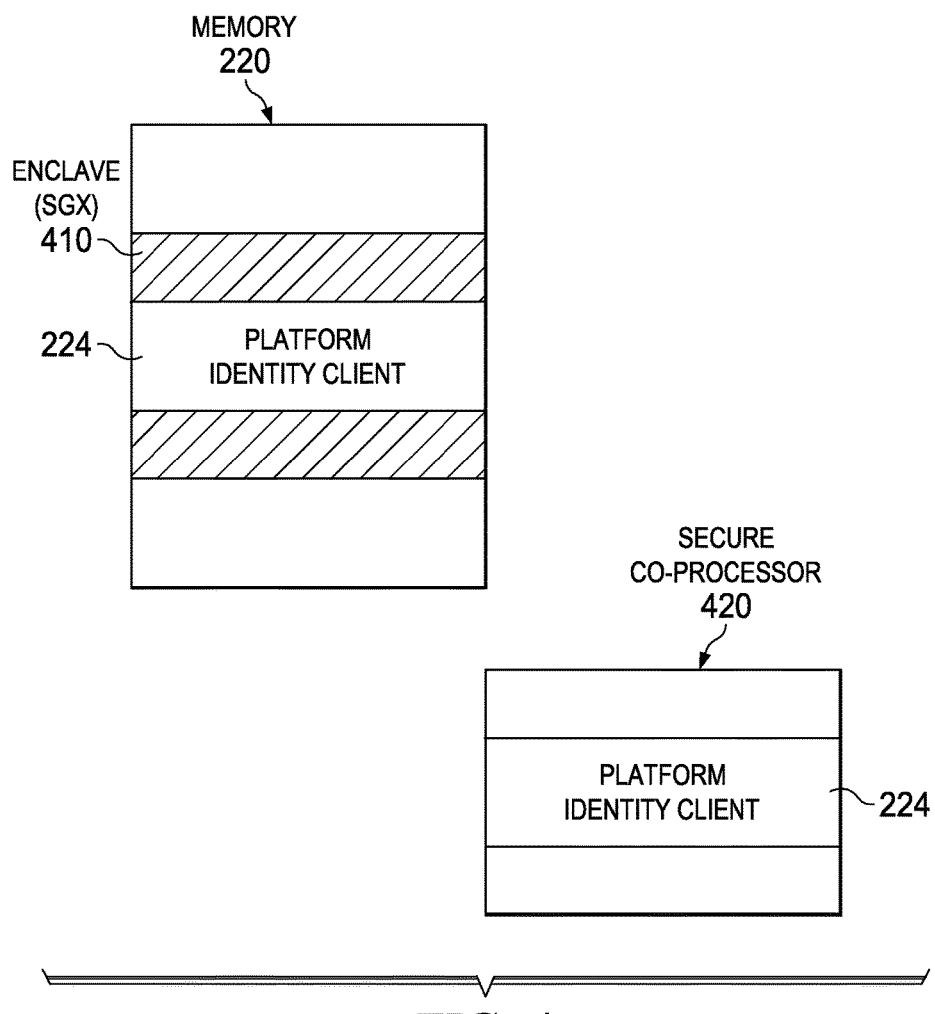
FIG. 4 is a block diagram of a secure environment according to one or more examples of the present Specification.

FIG. 4 is a block diagram of a TEE 400 according to one or more examples of the present Specification. In one example, TEE 400 includes a portion of memory 220 of FIG. 2. For example, a portion of memory 220 is designated as an enclave. All or a portion of PIC engine 224 may be included in enclave 410.

In certain embodiments, a secure co-processor 420 may be provided in addition to or instead of enclave 410. In that case, all or a portion of PIC engine 224 may be provided in secure coprocessor 420.

FIG. 5 is a flowchart of a method 500 performed by PIC engine 224 of computing device 110.

In block 510, PIC engine 224 detects one or more available services.

In decision block 520, PIC engine 224 determines whether the service is trusted.

If the service is trusted, then control passes to block 560, and follows the path described below in connection with block 560.

Returning to block 520, if the service is not trusted, then control passes to block 530.

Decision block 520 represents a classification of services into trusted and untrusted services. Trusted services may be services that user 120 trusts and permits to collect personally identifying information or otherwise to operate without the benefit of a TPI. Untrusted services are any other service.

In decision block 530, PIC engine 224 determines whether to establish a TPI.

If PIC engine 224 determines not to establish a TPI, then control passes to block 560, and the flow continues as described below.

Returning to block 530, if PIC engine 224 determines to establish a TPI, then control passes to block 540. Block 540 receives a service policy 550. This may be received from an internal database, from venue 160, or from a server 140. In one example, a server 140 negotiates service policy 550. Service policy 550 may include factors such as the nature of information to be provided in the TPI and the TPI. In some examples, the level of service provided by venue operator 180 may correlate directly to how much information the user is willing to provide in service policy 550. Venue operator 160 may, in some cases, push out a default value representing a preferred level of data.

In block 544, PIC engine 224 generates the TPI, which in some cases may include digitally signing the TPI in a TEE 400.

In block 560, computing device 110 connects to the available service.

Decision block 570 is a timing loop that waits for the TPI to expire. Once the TPI expires, control passes to block 580.

In block 580, PIC engine 224 destroys the TPI.

In block 590, the method is done.

FIG. 6 is a flow chart of a method 600 performed by one or both of platform identity server 324 and attestation server 326 of a platform identity server 140 and/or attestation server 142 according to one or more examples of the present Specification.

In block 610, platform identity server 324 receives a connection request from a client device.

In block 620, clock platform identity server 324 receives a TPI from the client device 110.

In block 630, platform identity server 324 may optionally validate the TPI with attestation server 142. Note that this may be required only in cases where TPI validation is deemed necessary or important.

In decision block 640, platform identity server 324 determines whether the TPI is valid.

If the TPI is not valid, then client device 110 may not permitted to connect, and control passes to block 690 where the method is done.

Returning to block 640, if the TPI is valid, then control passes to block 660.

In block 660, platform identity server 140 connects the service to the end user's computing device 110.

In block 680, platform identity server 324 stores the TPI and continues to perform analytics for so long as the TPI is valid. Advantageously, with a verified TPI, platform identity server 140 and venue operator 180 may trust that the semi-anonymous metrics provided with the TPI are valid, which increases the value of the data. This provides a reasonable compromise for the semi-anonymous nature of the data.

In block 690, the method is done.

Figure 7:
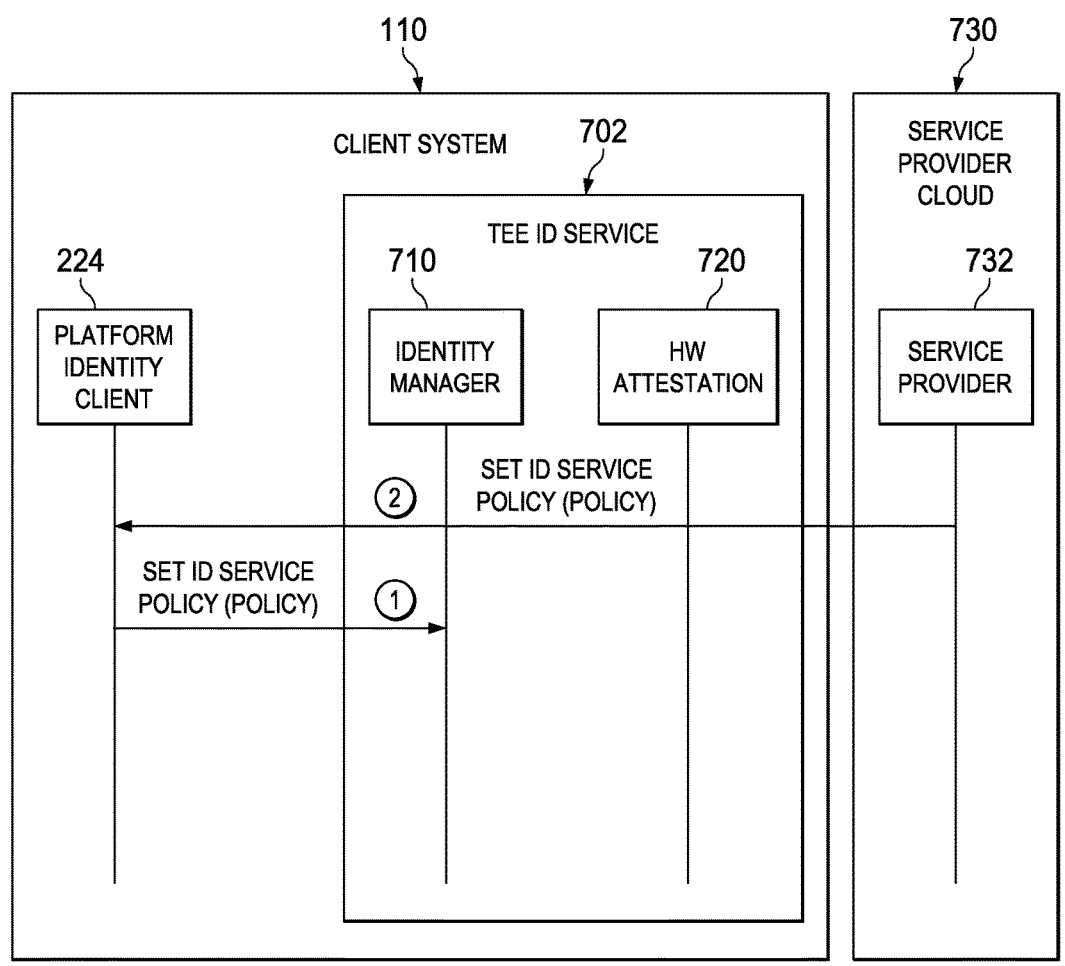
FIG. 7 is a signal flow diagram of a method according to one or more examples of the present Specification.

FIG. 7 is a signal flow diagram 700 of a method of negotiating a service policy according to one or more examples of the present specification.

In this figure a service provider cloud 730 includes a service provider block 732. Service provider cloud 730 may be provided by servers 140 operated by or on behalf of venue operator 180. By way of illustration, in this example, service provider cloud 730 is separate from attestation server 142.

In operation 1, service provider 732 sends a signal SET ID SERVICE POLICY to platform identity client PIC engine 224.

PIC engine 224 may then receive user input, including providing the user with a default service policy, and receiving feedback on whether the user wants to alter the default service policy parameters. As noted above, the service policy may include the types of data or metadata that may be collected by service provider 732, and may also include an expiry for the TPI.

Once PIC engine 224 has generated the correct service policy parameters, PIC engine 224 in operation 2 provides service policy parameters to TEE ID service 702. In this example, TEE ID service 702 includes an identity manager 710. Identity manager 710 may provide the portions of PIC engine 224 that actually generate the EPID and append certain information, such as demographic information permitted by the user 120 to form TPI.

Hardware attestation 720 may append a secure signature to the TPI so that service provider 732 can recognize and verify TPI.

After the operations of FIG. 7, client system 110 has generated a TPI and is prepared to upload the TPI to service provider 732 with relevant data, and to begin providing telemetry.

Figure 8:
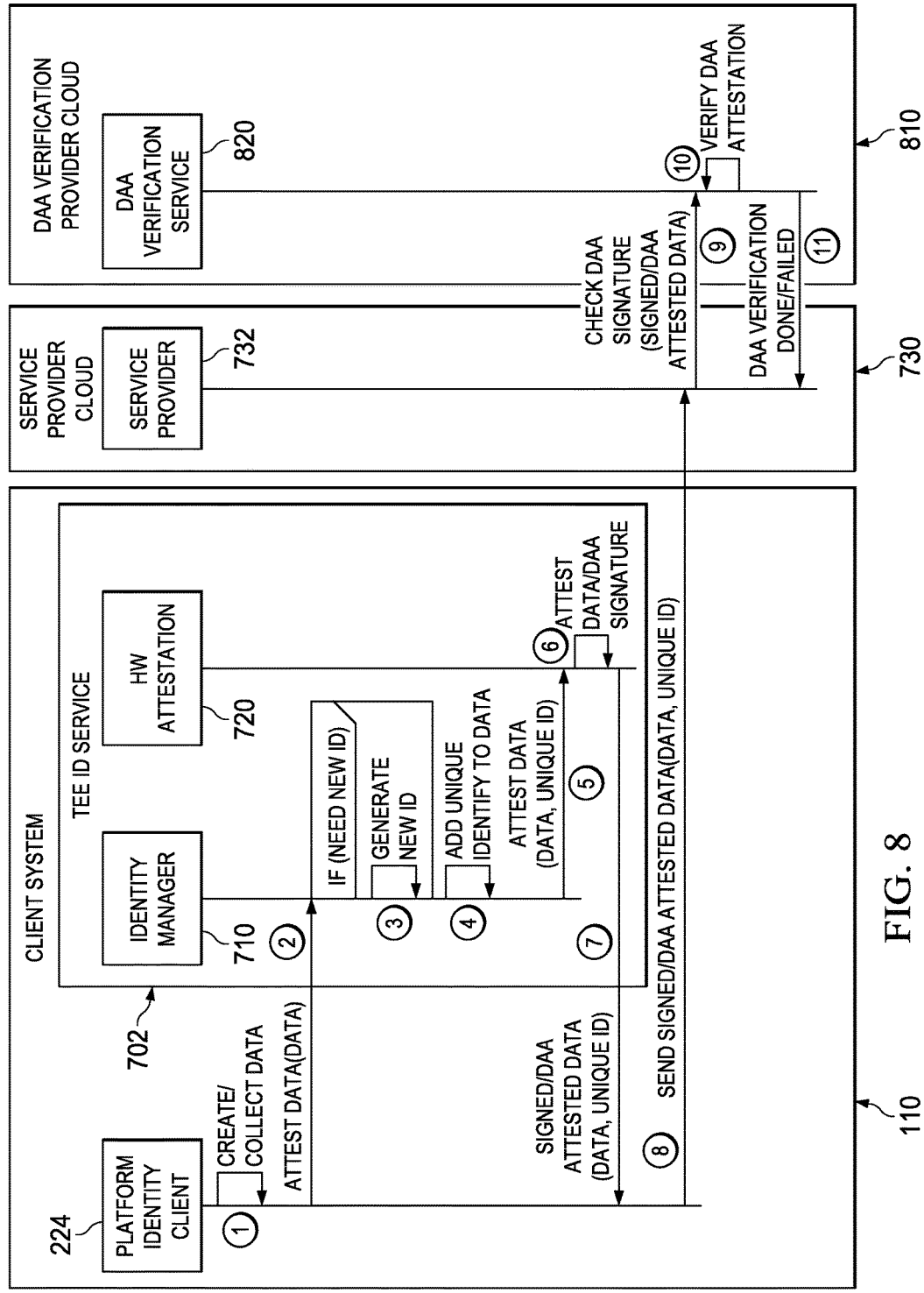
FIG. 8 is a signal flow diagram of a method according to one or more examples of the present Specification.

FIG. 8 is a signal flow diagram of attestation and telemetry flow according to one or more examples of the present Specification. In FIG. 8, client system 110 cooperates with service provider 730 and attestation server 142, which provides DAA verification cloud services.

At operation 1, PIC engine 224 creates and/or collects data.

At operation 2, PIC engine 224 provides attestation data to identity manager 710 of TEE ID service 702.

At operation 3, if a new TPI is needed, then TEE ID service 702 generates a new EPID.

At operation 4, TEE ID service adds unique identification data to the EPID to form the TPI.

At operation 5, identity manager 710 provides an attest data request to hardware attestation 720.

At operation 6, hardware attestation 720 adds a DAA signature to attestation data.

In operation 7, hardware attestation 720 provides to PIC engine 224 the signed/DAA attested data, including the data and EPID. It should be understood that EPID is a flavor of DAA that supports rich revocation schemes.

In operation 8, PIC engine 224 sends signed DAA attested data, including the data and EPID to service provider 732 of service provider cloud 730.

At operation 9, service provider 732 sends a signal CHECK DAA SIGNATURE, including the signed/DAA attested data to attestation server 142.

At operation 10, attestation server 142 verifies the DAA of the TPI.

At operation 11, attestation server 142 provides back to service provider 732 a signal that the DAA verification was either successful or failed.

If the DAA verification was successful, then the data may be trusted. If the verification was unsuccessful, the data may remain untrusted. Advantageously, the value of data is increased for venue operator 180 because telemetry data provided with the TPI can now be trusted as genuine to a high degree of confidence.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for"

or "steps for" are specifically used in the particular claims; and (b) does not intend, by any statement in the Specification, to limit this disclosure in any way that is not otherwise reflected in the appended claims.

Example Implementations

There is disclosed in an example 1, a platform identity client device comprising: a network interface; and one or more logic elements comprising a platform identity client (PIC) engine operable for: detecting an available service on the network interface; generating a temporary pseudonymous identity (TPI); and sending the TPI to the available service on the network interface.

There is disclosed in an example 2, the apparatus of example 1, wherein the PIC engine further comprises a trusted execution environment (TEE), and wherein the PIC engine is further operable for securely signing the TPI in the TEE.

There is disclosed in an example 3, the apparatus of example 2, wherein generating the TPI comprises mixing a random or pseudorandom seed with a basename and an expiry.

There is disclosed in an example 4, the apparatus of example 2, wherein the TEE comprises a secure memory area or secure hardware.

There is disclosed in an example 5, the apparatus of example 1, wherein the PIC engine is further operable for setting an expiry for the TPI.

There is disclosed in an example 6, the apparatus of example 5, wherein the PIC engine is further operable for destroying the TPI after the expiry.

There is disclosed in an example 7, the apparatus of example 6, wherein the PIC engine is further operable for generating a second TPI after destroying the TPI.

There is disclosed in an example 8, the apparatus of example 1, wherein detecting the available service comprises identifying an online service.

There is disclosed in an example 9, the apparatus of example 1, wherein detecting the available service comprises identifying an available wireless network connection for a physical venue.

There is disclosed in an example 10, the apparatus of example 1, wherein detecting the available service comprises communicatively coupling to a public service provider.

There is disclosed in an example 11, the apparatus of example 1, wherein the PIC engine is further operable for providing non-personally-identifying demographic data in the TPI.

There is disclosed in an example 12, the apparatus of example 1, wherein the PIC engine is further operable for providing telemetry data to the available service.

There is disclosed in an example 13, the apparatus of example 1, wherein the PIC engine is further operable for detecting a second available service on the network interface, the second available service different from the first available service; generating a second TPI, the second TPI different from the first TPI; and sending the second TPI to the second available service on the network interface.

There is disclosed in an example 14, one or more computer-readable mediums having stored thereon instructions for instructing a processor for providing a platform identity client (PIC) engine operable for: detecting an available network service; generating a temporary pseudonymous identity (TPI); and sending the TPI to the available network service.

There is disclosed in an example 15, the one or more computer-readable mediums of example 14, wherein the PIC engine further comprises a trusted execution environment (TEE), and wherein the PIC engine is further operable for securely signing the TPI in the TEE.

There is disclosed in an example 16, the one or more computer-readable mediums of example 15, wherein generating the TPI comprises mixing a random or pseudorandom seed with a basename and an expiry.

There is disclosed in an example 17, the one or more computer-readable mediums of example 14, wherein the PIC engine is further operable for setting an expiry for the TPI.

There is disclosed in an example 18, the one or more computer-readable mediums of example 14, wherein detecting the available service comprises identifying an online service.

There is disclosed in an example 19, the one or more computer-readable mediums of example 14, wherein detecting the available service comprises identifying an available wireless network connection for a physical venue.

There is disclosed in an example 20, the one or more computer-readable mediums of example 14, wherein detecting the available service comprises communicatively coupling to a public service provider.

There is disclosed in an example 21, the one or more computer-readable mediums of example 14, wherein the PIC engine is further operable for providing non-personally-identifying demographic data in the TPI.

There is disclosed in an example 22, the one or more computer-readable mediums of example 14, wherein the PIC engine is further operable for providing telemetry data to the available service.

There is disclosed in an example 23, the one or more computer-readable mediums of example 14, wherein the PIC engine is further operable for: detecting a second available service on the network interface, the second available service different from the first available service; generating a second TPI, the second TPI different from the first TPI; and sending the second TPI to the second available service on the network interface.

There is disclosed in an example 24, a platform identity server comprising: a network interface; and one or more logic elements comprising a platform identity server engine operable for: receiving a connection request from a platform identity client (PIC) over the network interface; negotiating a service policy with the PIC; receiving a temporary pseudonymous identity (TPI) from the PIC; requesting telemetry data from the PIC; receiving telemetry data from the PIC; and providing targeted content to the PIC, the targeted content based on the telemetry.

There is disclosed in an example 25, the platform identity server of example 24, wherein the PIC is further operable for: providing the TPI to an attestation server; and receiving an attestation verification from the attestation server.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

What is claimed is:

1. A platform identity client (PIC) device comprising:
a network interface; and
one or more hardware and/or software logic elements comprising a platform identity client engine operable for:
detecting via the network interface an available network service provided by an operator of a venue;
generating a temporary pseudonymous identity (TPI) comprising direct anonymous attestation to the network service provided by the operator of the venue;
sending the TPI to the available network service via the network interface;
accessing the available network service; and
receiving from the operator of the venue an advertisement or promotion for a good or service provided by the venue, wherein the advertising and promotion is directed to a user of the PIC device temporarily uniquely identified by the TPI, and wherein the TPI is dissociated from personally identifying information about the user.

2. The platform identity client device of claim 1, wherein detecting the available service comprises identifying an online service.

3. The platform identity client device of claim 1, wherein detecting the available service comprises identifying an available wireless network connection for a physical venue.

4. The platform identity client device of claim 1, wherein detecting the available service comprises communicatively coupling to a public service provider.

5. The platform identity client device of claim 1, wherein the PIC engine is further operable for providing non-personally-identifying demographic data in the TPI.

6. The platform identity client device of claim 1, wherein the PIC engine is further operable for providing telemetry data to the available service.

7. The PIC device of claim 1, wherein the PIC client is further to receive targeted content.

8. The platform identity client device of claim 1, wherein the PIC engine is further operable for setting an expiry for the TPI.

9. The platform identity client device of claim 8, wherein the PIC engine is further operable for destroying the TPI after the expiry.

10. The platform identity client device of claim 1, wherein the PIC engine further comprises a trusted execution environment (TEE), and wherein the PIC engine is further operable for securely signing the TPI in the TEE.

11. The platform identity client device of claim 10, wherein generating the TPI comprises mixing a random or pseudorandom seed with a basename and an expiry.

12. The platform identity client device of claim 10, wherein the TEE comprises a secure memory area or secure hardware.

13. One or more tangible, non-transitory computer-readable mediums having stored thereon instructions for instructing a processor for providing a platform identity client (PIC) engine operable for:
detecting via the network interface an available network service provided by an operator of a venue;
generating a temporary pseudonymous identity (TPI), comprising direct anonymous attestation to the network service provided by the operator of the venue;
sending the TPI to the available network service via the network interface;
accessing the available network service; and
receiving from the operator of the venue an advertisement or promotion for a good or service provided by the venue, wherein the advertising and promotion is directed to a user of the PIC device temporarily uniquely identified by the TPI, and wherein the TPI is dissociated from personally identifying information about the user.

14. The one or more computer-readable mediums of claim 13, wherein the PIC engine is further operable for setting an expiry for the TPI.

15. The one or more computer-readable mediums of claim 13, wherein detecting the available service comprises identifying an online service.

16. The one or more computer-readable mediums of claim 13, wherein detecting the available service comprises identifying an available wireless network connection for a physical venue.

17. The one or more computer-readable mediums of claim 13, wherein the PIC engine is further operable for providing non-personally-identifying demographic data in the TPI.

18. The one or more computer-readable mediums of claim 13, wherein the PIC engine is further operable for providing telemetry data to the available service.

19. The one or more computer-readable mediums of claim 13, wherein the PIC engine is further to receive targeted content.

20. The one or more computer-readable mediums of claim 13, wherein the PIC engine further comprises a trusted execution environment (TEE), and wherein the PIC engine is further operable for securely signing the TPI in the TEE.

21. The one or more computer-readable mediums of claim 20, wherein generating the TPI comprises mixing a random or pseudorandom seed with a basename and an expiry.

22. A platform identity server comprising:
a network interface; and
one or more logic elements comprising a platform identity server engine operable for:
receiving a connection request from a platform identity client (PIC) over the network interface;
negotiating a service policy with the PIC;
receiving a temporary pseudonymous identity (TPI) from the PIC, the TPI temporarily uniquely identifying a user of the PIC while being dissociated from personally identifying information about the user;
requesting telemetry data from the PIC;
receiving telemetry data from the PIC, the telemetry data identifying attributes of the user; and
based on the telemetry data, providing to the PIC a targeted advertisement or promotion for a good or service provided by an operator of the platform identity server.

23. The platform identity server of claim 22, wherein the PIC is further operable for:
providing the TPI to an attestation server; and
receiving an attestation verification from the attestation server.

* * * * *

UNITED STATES PATENT AND TRADEMARK OFFICE
CERTIFICATE OF CORRECTION

| | |
|---|---|
| PATENT NO. | : 9,798,895 B2 |
| APPLICATION NO. | : 14/495959 |
| DATED | : October 24, 2017 |
| INVENTOR(S) | : Alex Nayshtur et al. |

It is certified that error appears in the above-identified patent and that said Letters Patent is hereby corrected as shown below:

On the Title Page

Item (72), in Column 1, in "Inventors", Line 6, delete "Jeruslaem (IL);" and insert -- Jerusalem (IL); --, therefor.

Signed and Sealed this
Thirteenth Day of November, 2018

Andrei Iancu
*Director of the United States Patent and Trademark Office*